(12) United States Patent
Jakobs

(10) Patent No.: US 11,823,519 B2
(45) Date of Patent: Nov. 21, 2023

(54) ARRANGEMENT AND METHOD FOR PROCESSING SECURITY DOCUMENTS

(71) Applicant: GIESECKE+DEVRIENT CURRENCY TECHNOLOGY GMBH, Munich (DE)

(72) Inventor: Andreas Jakobs, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/279,307

(22) PCT Filed: Sep. 17, 2019

(86) PCT No.: PCT/EP2019/000269
§ 371 (c)(1),
(2) Date: Mar. 24, 2021

(87) PCT Pub. No.: WO2020/064141
PCT Pub. Date: Apr. 2, 2020

(65) Prior Publication Data
US 2021/0398381 A1   Dec. 23, 2021

(30) Foreign Application Priority Data

Sep. 24, 2018  (DE) ..................... 10 2018 007 564.9

(51) Int. Cl.
*G07D 11/34*   (2019.01)
*G07D 11/36*   (2019.01)
(Continued)

(52) U.S. Cl.
CPC ............. *G07D 11/34* (2019.01); *G06F 18/22* (2023.01); *G06V 10/145* (2022.01); *G06V 10/22* (2022.01);
(Continued)

(58) Field of Classification Search
CPC ........ G07D 11/50; G07D 11/12; G07D 11/34; G07D 11/24; G07D 11/36; G07D 11/30;
(Continued)

(56) References Cited

U.S. PATENT DOCUMENTS 6,640,156 B1 * 10/2003 Brooks .................. G07D 11/40
 700/223
7,866,545 B2   1/2011 Rapf et al.
(Continued)

FOREIGN PATENT DOCUMENTS

CN    104854626 A    8/2015
DE    102004033092 A1    1/2006
(Continued)

OTHER PUBLICATIONS

International Search Report and Written Opinion from PCT Application No. PCT/EP2019/000269, dated Jan. 15, 2020.
(Continued)

*Primary Examiner* — Marnie A Matt
(74) *Attorney, Agent, or Firm* — WORKMAN NYDEGGER

(57) ABSTRACT

An arrangement for processing of value documents at a preparation station, prior to their processing by means of a value document processing apparatus, involves inserting the value documents into a container divided into several storage regions. The value documents of the respective deposit are removed at the preparation station from delivery containers which respectively include a unique deposit identification. A monitoring device automatically captures into which storage region of the value document container the value documents are inserted. A protocol device connected to the monitoring device links the respective deposit identification to the container identification and to the respective storage region identification and transmits this linking infor-
(Continued)

mation to a control device or to an accounting device, which assigns the value documents present in the respective storage region of the respective value document container to the respective deposit with the aid of the linking information transmitted by the protocol device.

10 Claims, 5 Drawing Sheets

(51) Int. Cl.
| | |
|---|---|
| *G07D 11/24* | (2019.01) |
| *G06V 30/40* | (2022.01) |
| *G06V 10/22* | (2022.01) |
| *G06V 10/145* | (2022.01) |
| *H04N 7/18* | (2006.01) |
| *G06F 18/22* | (2023.01) |
| *H04N 23/80* | (2023.01) |

(52) U.S. Cl.
CPC ............. *G06V 30/40* (2022.01); *G07D 11/24* (2019.01); *G07D 11/36* (2019.01); *H04N 7/18* (2013.01); *H04N 23/80* (2023.01)

(58) Field of Classification Search
CPC .... G06T 7/0008; G06Q 10/10; G06K 9/6215; G06V 10/14; G06V 10/02; G06V 30/40; H04N 5/23229; H04N 7/01
USPC ........................................................ 348/135
See application file for complete search history.

(56) References Cited

U.S. PATENT DOCUMENTS

| | | | |
|---|---|---|---|
| 8,054,183 | B2 | 11/2011 | Villiger |
| 9,846,670 | B2 | 12/2017 | Rohrl et al. |
| 9,881,439 | B2 | 1/2018 | Demmeler |
| 2003/0011466 | A1 | 1/2003 | Samuel et al. |
| 2003/0015395 | A1* | 1/2003 | Hallowell .............. B65H 33/08 194/206 |
| 2007/0296202 | A1* | 12/2007 | Zwahlen ................ G07D 11/26 283/58 |
| 2008/0278322 | A1 | 11/2008 | Villiger |
| 2008/0283589 | A1 | 11/2008 | Rapf et al. |
| 2012/0175217 | A1 | 7/2012 | Demmeler |
| 2015/0317268 | A1* | 11/2015 | Rohrl ....................... G07D 7/12 710/106 |

FOREIGN PATENT DOCUMENTS

| | | |
|---|---|---|
| DE | 102009042891 A1 | 3/2011 |
| DE | 102018007564 A1 | 3/2020 |
| WO | 2006094962 A1 | 9/2006 |

OTHER PUBLICATIONS

Search Report from corresponding Chinese Patent Application No. 201980062662, dated Aug. 18, 2022.

* cited by examiner

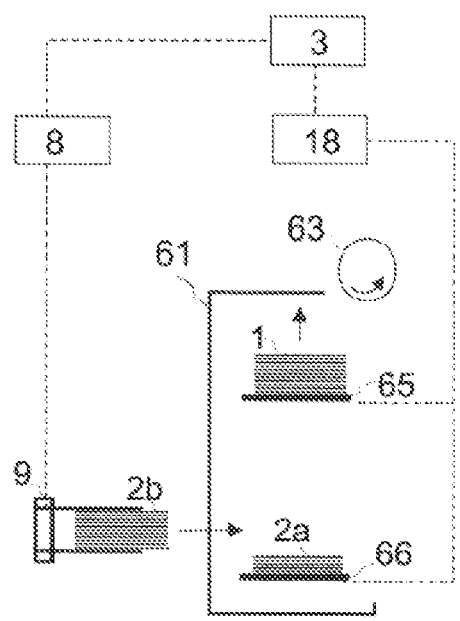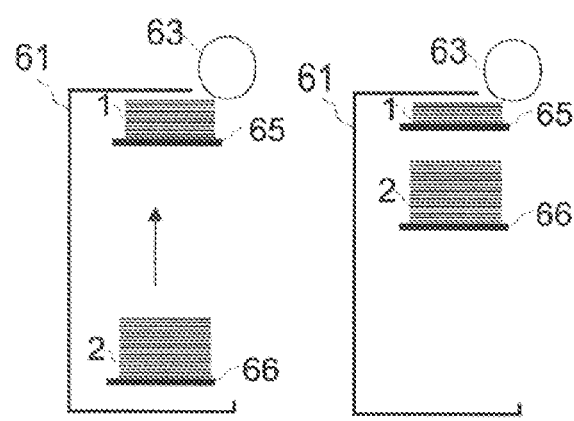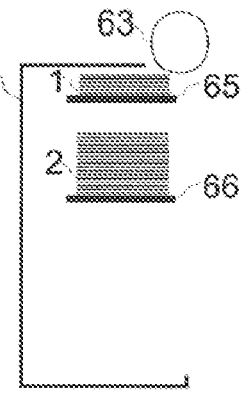
Fig. 3a Fig. 3b Fig. 3c
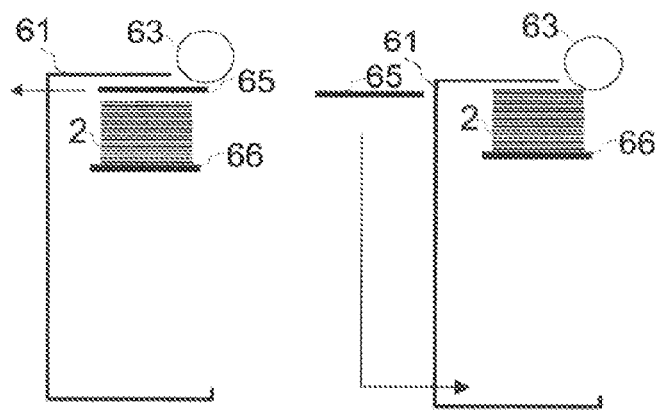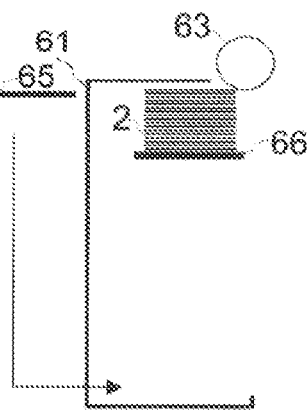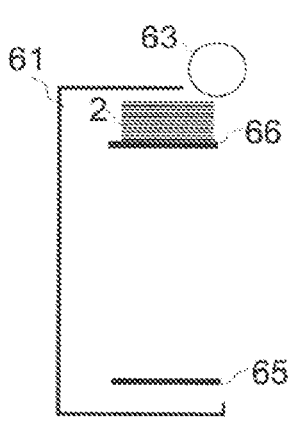
Fig. 3d Fig. 3e Fig. 3f

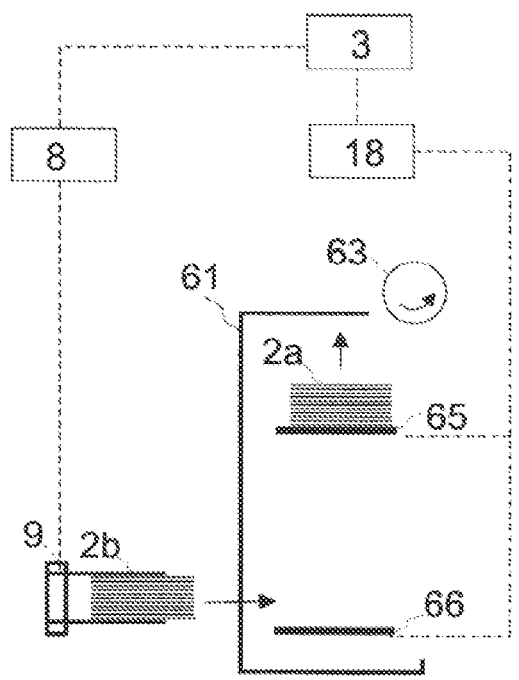
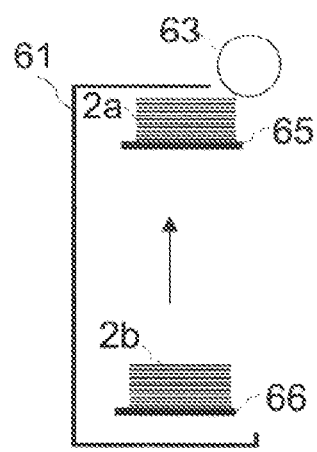
Fig. 4a  Fig. 4b
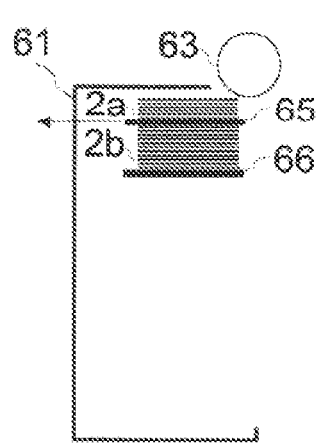 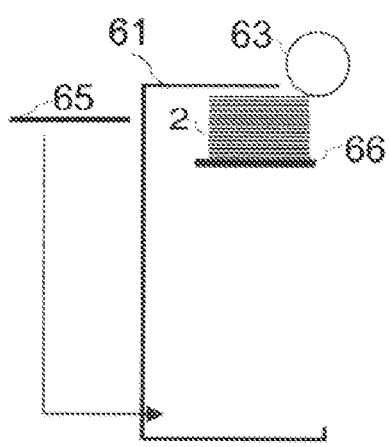 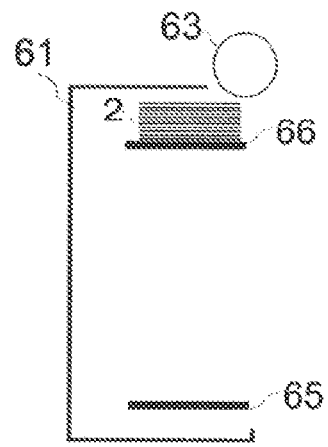
Fig. 4c  Fig. 4d  Fig. 4e

ARRANGEMENT AND METHOD FOR PROCESSING SECURITY DOCUMENTS

BACKGROUND

The present invention relates to an arrangement and a method for processing value documents, in particular bank notes, vouchers, tickets, cheques.

For receiving bank notes, value document containers are used in which the value documents, in particular bank notes, are present in deposits. Deposits are here understood to mean a quantity of at least one bank note or more which is associated with a certain person, an account, an accounting unit etc. Moreover, besides bank notes, the units may also comprise checks, vouchers or other value documents. Before processing, the individual deposits are prepared for machine processing with a bank note processing apparatus and filled into value document containers for this purpose. During preparation, information about the payment, among other things a deposit identification, is captured and made available for processing by the bank note processing apparatus. The deposit identification may be linked to specifications about the depositor, an account number, the expected value of the deposit, a unique transaction number, etc.

For separating different stacks of value documents, from DE102009042891 A1 it is known to use value document containers which are subdivided in several storage regions for value documents by separator elements. Into the containers, which are open on one side, one or several value document stacks of loose value documents are inserted. For removing the value documents, the value document container is usually arranged such that its open side points upward and the value documents stand in the value document container on their longitudinal edges. In order to automatically remove the value document stack from the value document container by a gripper, a gripper is used which includes e.g. two rake-like gripping elements of several gripping fingers which can be moved towards and away from each other in order to grip the value document stack, remove it from the value document container and place it down remote from the value document container.

In order to make possible an interruption-free processing by the bank note processing apparatus, the deposits are usually separated from each other by separator cards (e.g. header cards) which are inserted between different deposits. The bank note processing apparatus recognizes these separator cards and thus also the start of a new deposit. Upon preparing the value documents the separator cards are inserted into the value document container at the beginning and/or at the end of the respective deposit.

A disadvantage of the use of separator cards is that, when these are transported through the value document processing apparatus immediately before or after the associated value documents, a so-called cross-over error can occur upon singling, transporting or stacking the value documents, in which a value document is overtaken by a separator card. As a result, the overtaken value document is assigned to an incorrect deposit, which must be subsequently corrected with great effort and may entail a repeated machine check of the value documents by the value document processing apparatus.

SUMMARY

It is therefore an object of the present invention to avoid the use of header cards or separator cards.

The invention relates to an arrangement for processing value documents which, at a preparation station, prior to their processing by means of a value document processing apparatus are inserted into a value document container. The value document container is subdivided (e.g. by separator elements) in several storage regions for value documents. The value document container includes a unique container identification, e.g. a barcode, QR code or RFID element contained on the value document container, which makes the value document container uniquely identifiable. Each storage region of a value document container has assigned thereto a unique storage region identification. The value document container which contains the value documents of different deposits in different storage regions is transported from the preparation station to the value document processing apparatus (e.g. to an input module or directly into the input pocket of the value document processing apparatus) after the preparation of the value documents.

At the preparation station, the value documents of the respective deposit are removed from one or several delivery containers which respectively include a unique deposit identification. The deposit identification can be provided by a barcode, QR code or an RFID element contained on the delivery container and is read out by a corresponding reader when the deposit identification is captured.

At the preparation station, a monitoring device is present which is adapted to automatically capture into which first storage region or into which first storage regions of the value document container the value documents of a first deposit, which were removed from a first delivery container, are inserted, and into which second storage region or into which second storage regions of the value document container the value documents of a second deposit, which were removed from a second delivery container, are inserted.

Furthermore, at the preparation station, a first capture device (e.g. barcode/QR code reader or RFID reader, manually operated or attached to the container receiving means) may optionally be present and a second capture device (barcode/QR code reader or RFID reader, manually operated or attached to the container receiving means) may optionally be present. The monitoring device or the first or the second capture device is adapted to capture a first deposit identification of the first deposit and a second deposit identification of the second deposit, whose value documents are inserted into the value document container. And the monitoring device or the first capture device is adapted to capture a container identification of the value document container arranged at the preparation station.

The arrangement includes a protocol device which is connected to the monitoring device and, where applicable, is connected to the first capture device and, where applicate, to the second capture device. Moreover, the arrangement includes a control device which is connected to the protocol device and/or an accounting device which is connected to the protocol device. The protocol device is adapted to link the first deposit identification to the container identification and to at least one storage region identification of at least one first storage region of the value document container, and to link the second deposit identification to the container identification and to at least one storage region identification of at least one (different) second storage region of the value document container, and to create corresponding linking information. The protocol device is adapted to transmit this linking information to the control device or to the accounting device, which indicates to which container identification and to which at least one storage region identification the first deposit identification is linked and to which container identification and to which at least one storage region identification the second deposit identification is linked. The software of the control device or the accounting device is adapted to assign the value documents present in the respective storage region of the respective value document container to the first or to the second deposit, respectively, with the aid of the linking information transmitted by the protocol device.

The respective container identification of a value document container has assigned thereto a unique storage region identification for each of its storage regions. This assignment is lodged e.g. in the software of the monitoring device and in the software of the protocol device and in the software of the control device or of the accounting device. The respective storage region identification may or may not be visually visible on the value document container.

The arrangement may moreover include an identification device which is adapted to (re)capture the container identification of the value document container and to transmit it to the control device. The identification device is e.g. a reader present at the input pocket of the value document processing apparatus, a manually operated reader at the value document processing apparatus or a reader of an input module of the value document processing apparatus.

The invention also relates to a method for processing value documents, in which at the preparation station a value document container is provided which is subdivided into several storage regions for value documents, each of the storage regions having a storage region identification assigned thereto. At the preparation site, the following steps are carried out:

capturing the container identification of the value document container with the aid of the monitoring device or with the aid of the first capture device or with the aid of the second capture device, capturing the first deposit identification of a first deposit whose value documents are to be inserted into the value document container, with the aid of the monitoring device or with the aid of the first capture device, removing the value documents of the first deposit from the delivery container of the first deposit and inserting the value documents of the first deposit into at least one first storage region of the value document container, whereby with the aid of the monitoring device it is automatically captured into which storage regions or into which one of the storage regions of the value document container the value documents of the first deposit are inserted and whereby with the aid of a protocol device the first deposit identification is linked with the at least one storage region identification of the at least one first storage region and to the container identification, capturing the second deposit identification of the second deposit whose value documents are to be inserted into the value document container, with the aid of the monitoring device or with the aid of the first capture device or with the aid of the second capture device, removing the value documents of the second deposit from the delivery container of the second deposit and inserting the value documents of the second deposit into at least one second storage region of the value document container, whereby with the aid of the monitoring device it is automatically captured into which storage regions or into which one of the storage regions of the value document container the value documents of the second deposit are inserted and whereby with the aid of the protocol device the second deposit identification is linked with the at least one storage region identification of the at least one second storage region and to the container identification.

The value document container is then transported from the preparation station to the value document processing apparatus for further processing of the value documents, in order to feed the value documents of the first and second deposit to the value document processing apparatus. The protocol device transmits linking information to the control device and/or to the accounting device, on the basis of which the control device or the accounting device can derive to which at least one storage region identification and to which container identification the first deposit identification is linked and to which at least one storage region identification and to which container identification the second deposit identification is linked.

On the basis of the counting results of the value document processing apparatus for the value documents removed from the respective storage region and on the basis of the assignment of these value documents to the respective deposit, the accounting device can carry out an accounting of the value documents of the respective (first or second) deposit, based on which e.g. a crediting can be initiated to the depositor of the respective deposit.

Alternatively or additionally, the control device may be adapted to control the input of the value documents of the first and second deposit into the value document processing apparatus (the insertion into the input pocket thereof) and/or the feed of the value documents of the first and second deposit inputted in the value document processing apparatus (inserted in the input pocket) to a singling device of the value document processing apparatus in dependence on the linking information.

No separator cards or header cards are used to distinguish the value documents of the different deposits. Neither in the value document container nor in the input pocket, the value documents of the respective deposit have a separator card or header card appended thereto. Instead, the deposit assignment of the value documents is guaranteed by the fact that the linking information is created upon inserting the value documents into the value document container and that this linking information is utilized during the further processing of the value documents removed from the value document container in order to assign the respective value documents to the correct deposit.

Further, the arrangement may include a removal device which is adapted to remove the value documents from the value document container and to input the value documents into a value document processing apparatus, e.g. to insert the value documents into the input pocket of the value document processing apparatus. The removal device can be equipped with a sensor for detecting a storage region identification which is present at the respective storage region (e.g. at the edge of the value document container). The value document processing apparatus includes a value document feeding device which is adapted to feed the inputted value documents to a singling device of the value document processing apparatus. The value document feeding device is arranged e.g. at or in the input pocket of the value document processing apparatus. In the value document processing apparatus, the singled value documents are checked, counted and then, where applicable, sorted with the aid of sensors. The removal device may be part of the value document processing apparatus or part of an input module of the value document processing apparatus or a stand-alone apparatus.

A gripper can be used as a removal device, which is configured to remove value documents contained in the value document container. The gripper is arranged such that it can insert a value document stack removed from the value document container into an input pocket of a value document processing apparatus. The gripper includes e.g. comb-like structures which are configured to engage in free recesses of the separator elements at the edge of the storage regions. A gripper control positions the gripper in dependence on the respective separator element position at a position above the value document container at which the gripper fingers of the gripper can dive into the container at the recesses of the respective separator element. As an alternative to a gripper, another removal device, e.g. a rake or a detachable clip, can be used to remove the value documents from the value document container and insert the value documents into the input pocket.

Upon removal of the value documents from the value document container, the linking information can be used to assign the removed value documents from the respective storage region of the value document container to the first and second deposit with the aid of the linking information. For the container identification ascertained by the identification device, the control device ascertains, on the basis of the linking information transmitted by the protocol device, in which storage regions or in which of the storage regions of the value document container the value documents of the first deposit and in which storage regions or in which of the storage regions the value documents of the second deposit are contained.

The control device which obtains the linking information from the protocol device may be the one control device of the removal device which is adapted to control the removal device such that the input of the value documents of the first and second deposit into the value document processing apparatus is carried out in dependence on the linking information.

However, the control device which obtains the linking information from the protocol device may also be a control device of the feeding device, which is adapted to control the feeding device such that the feed of the value documents of the first and second deposit inputted in the value document processing apparatus to the singling device of the value document processing apparatus is carried out in dependence on the linking information.

The control device may be adapted to control the input of the value documents of the first and second deposit into the value document processing apparatus and/or the feed of the value documents of the first and second deposit inputted in the value document processing apparatus to the singling device of the value document processing apparatus in dependence on the linking information, in particular to control this in such a way that all the value documents of the same deposit (all value documents of the first deposit or all those of the second deposit) are brought together and combined into one single value document stack upon the input or feed, but the value documents of the first deposit are not combined with the value documents of the second deposit upon the input or feed, rather the value documents of the different deposits remain separated from each other so that they are not mixed with each other.

In particular, the control device is adapted to cause the feeding device, upon feeding the value documents of the first deposit and of the subsequent second deposit to the singling device, to keep the value documents of the first deposit and the value documents of the second deposit separated from each other until the last value document of the first deposit has been drawn from the input pocket by the singling device.

The removal device is provided e.g. by an input module of the value document processing apparatus, which is adapted to input the value documents from the value document container into the value document processing apparatus. The input module may also include a container receiving means for receiving the value document container from which the removal device removes the value documents. The identification device can likewise be a component of the input module and be adapted to capture the container identification of the value document container and to transmit it to the control device of the input module. The identification device of the input module can be arranged at the container receiving means, but it can also be arranged outside the container receiving means in/at the input module. The control device of the removal device may be a control device of the input module, which is (communicatively) connected to the protocol device and is adapted to ascertain, for the value document container whose container identification has been captured by the identification device of the input module, on the basis of the linking information (transmitted by the protocol device) for each storage region of the respective value document container, with which respective deposit identification the respective storage region identification is linked, i.e. in which of the storage regions of the value document container the value documents of the first deposit are contained and in which of the storage regions of the value document container the value documents of the second deposit are contained.

The input module can be attached to a value document processing apparatus such that value document stacks can be inserted into the value document processing apparatus out of the input module by the removal device. The input module may include a gripper for removing value documents contained in the value document container and a control for controlling the motion of the gripper. The gripper control is configured to control the motion of the gripper for removing value documents from the value document container in such a way that the gripper is positioned at a position above the respective storage region and that the gripper from this position dives into the value document container in order to remove value documents from the value document container. The input module may include a container receiving means which receives the value document container in such a way that the relative position thereof to the gripper is predetermined and reproducible. The container receiving means can be configured for a manual insertion of the value document container. Preferably, the container receiving means includes a rotation protection, so that the value document container can be inserted into the container receiving means only in the correct orientation. This guarantees the correct position of the storage regions. Where applicable, the input module includes several container receiving means, so that the apparatus can simultaneously receive several value document containers loaded with value documents.

As an alternative to an input module, the input pocket of the value document processing apparatus may be adapted such that the value document container is received directly in the input pocket, with the identification device also being present at or in the input pocket. The removal device, e.g. a gripper or rake, can be made available by the value document processing apparatus or from outside.

The control device of the removal device is adapted to control the removal device such that it removes the value documents of the first deposit and of the second deposit from the value document container and inserts them separately from each other into an input pocket of the value document processing apparatus. This may be effected by placing the value documents of the different deposits separately from each other on two different receiving means of the feeding device. Or the value documents of the first and second deposit are placed on the same receiving means temporally separated from each other, the value documents of the second deposit being only inserted into the input pocket after the last value document of the first deposit has been drawn from the input pocket with the help of the singling device.

In a first preferred embodiment, the input of the value documents into the value document processing apparatus is carried out in dependence on the linking information. In this case, the value documents of the same deposit are brought together and are combined into one single value document stack already upon the input into the value document processing apparatus. The feeding of the inputted value documents to the singling device can then be carried out without taking into account the linking information.

In this embodiment, the control device is adapted for controlling the removal device. It controls, for the value document container whose container identification has been captured by the identification device, the removal device in such a way that the removal device carries out the input of the value documents into the value document processing apparatus in dependence on the linking information. Here, the removal device brings together all the value documents of the first/second deposit, which it removes, where applicable, from different storage regions of the value document container, upon the input into the value document processing apparatus, so that they are combined into one single value document stack. However, the value documents of the second deposit are inserted into the value document processing apparatus temporally or spatially separated from the value documents of the first deposit so that they are not mixed with each other. In this embodiment, the feeding device may include one single receiving means for feeding value documents to the singling device, but there can also be used several receiving means.

For example, the value document feeding device includes at least two receiving means for feeding value documents to the singling device and the removal device is adapted to place the value documents on the two receiving means of the value document feeding device. The control device controls the removal device in such a way that the removal device carries out the placing of the value documents onto the two receiving means in dependence on the linking information, whereby all the value documents of the first deposit, which are removed, where applicable, from different storage regions of the value document container, are brought together and combined into one single value document stack upon being placed on the first receiving means, and all the value documents of the second deposit, which are removed, where applicable, from different storage regions of the value document container, are brought together and combined into one single value document stack upon being placed on the second receiving means (a receiving means other than that of the first deposit).

In a second preferred embodiment, the input of the value documents into the value document processing apparatus is carried out independently of the linking information, but the feeding of the inputted value documents to the singling device is carried out in dependence on the linking information. Here, the value documents of the same deposit, which are removed from different storage regions, are not brought together already upon the input into the value document processing apparatus, but are first inputted into the value document processing apparatus separately from each other. However, the value documents of the same deposit are then brought together and combined into one single value document stack upon the feed to the singling device.

For this, in the second embodiment, a feeding device is used which is adapted to combine the value documents which were placed on the two receiving means into one single value document stack, where applicable. The control device of the feeding device controls the feeding device on the basis of the linking information such that the value documents of the same deposit, which were removed from different storage regions of the value document container, are brought together and combined into one single value document stack with the aid of the feeding device. Compared to the first embodiment, there arise no waiting periods caused by bringing together the value documents upon insertion.

In this embodiment, the removal device is controlled such that the value documents of the same deposit, which the removal device may remove from different storage regions of the value document container, are not yet brought together upon the input into the value document feeding device. The placing of the value documents onto the two receiving means of the value document feeding device by the removal device is not carried out in dependence on the linking information, rather all the value documents of the respective deposit, which are removed from different storage regions of the value document container, are first placed onto different receiving means independently of their deposit association. The control device of the value document feeding device is adapted to decide on the basis of the linking information, whether the value documents placed on the two receiving means are fed separately from each other or together (as a combined value document stack) to the singling device. The value documents placed on the two receiving means are fed separately from each other if they belong to different deposits, and are fed together if they belong to the same deposit.

The monitoring device may include a camera which is adapted to take an image of the value document container for each deposit, before and after the insertion of the value documents of the respective deposit in the value document container provided at the preparation station. The monitoring device is e.g. adapted to carry out a difference image analysis for each inserted deposit, in which it is established, on the basis of differences between the two images of the value document container which were taken before and after the insertion of the respective value document stack, into which at least one storage region of the value document container the value documents of the respective deposit were inserted.

Alternatively, the monitoring device may include a light barrier curtain made of a plurality of light barriers positioned at the preparation station next to the place intended for the value document container. These are arranged along an insertion direction along which the value documents are inserted into the value document container. Their light beams run parallel to each other and transverse or perpendicular to the insertion direction and substantially parallel to the surface of the value document container. Based on (interruption) signals of the light barriers, it is established (e.g. by the protocol device) in which at least one storage region of the value document container the value documents of the respective deposit were inserted.

Alternatively, the monitoring device may include at least one distance sensor which is arranged at one container end of the value document container provided at the preparation station and whose capture region runs parallel to the surface of the value document container (at least to the opposite end). The distance sensor is adapted to determine the distance of an object (value document stack and/or a person's hand) that has entered its capture region from the distance sensor. Based on the determined distance, it is established (e.g. by the protocol device) in which storage region of the value document container the value documents of the respective deposit were inserted.

BRIEF DESCRIPTION OF THE DRAWINGS

Hereinafter, the invention will be explained by way of example with reference to the following figures. There are shown.

DETAILED DESCRIPTION OF VARIOUS EMBODIMENTS

Figure 1A:
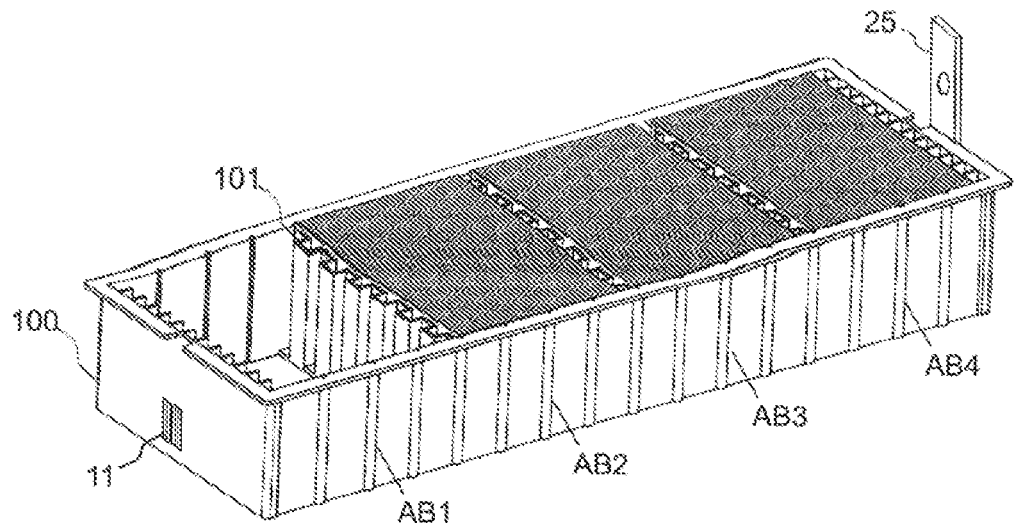
FIG. 1a a value document container with four storage regions.
Figure 1D:
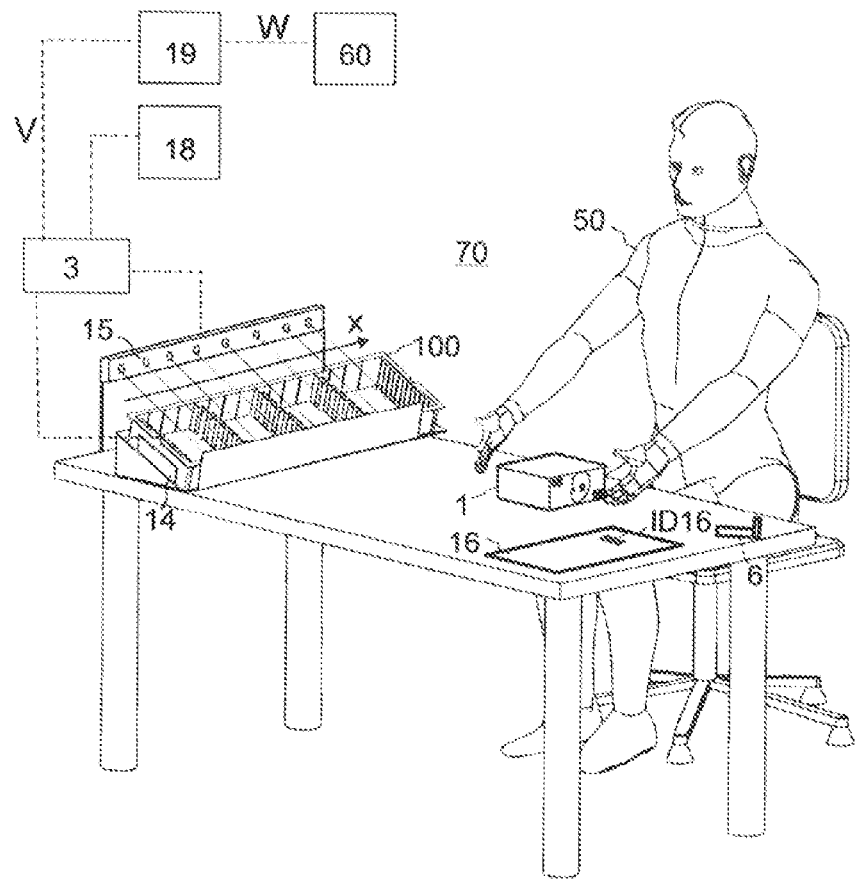
FIG. 1b an apparatus for processing value documents, having an input module attached thereto, FIG. 1c the insertion of the value documents into a value document processing apparatus by an input module, FIG. 1d a preparation station for value documents, FIG. 2 an arrangement for processing value documents, having preparation station and value document processing apparatus, FIG. 3a-f bringing together value documents of the same deposit upon insertion, according to the first embodiment, FIG. 4a-e bringing together value documents of the same deposit upon feeding, according to the second embodiment.

FIG. 1a shows a value document container 100 (hereinafter only referred to as a container) for receiving value documents, in which the value documents 1 are inserted so as to stand on their longitudinal edges. The container 100 is subdivided by three separator elements 101 into four storage regions in which value documents are kept separated from each other. For removing the value documents, a gripper 9 is used, cf. FIG. 1c, which is lowered into the container 100 in order to remove the respective value document stack of a storage region. The container 100 includes an identification, which e.g. is coded in a barcode 11, by which the container is uniquely identifiable. Additionally or alternatively, the container 100 may include a data carrier as an identification, e.g. an RFID transponder, in which information about the value documents 1 contained in the container are stored. Said information comprises e.g. information about the depositor of the respective value document stack and, where applicable, about the number or the total value of the value documents.

Figure 1B:
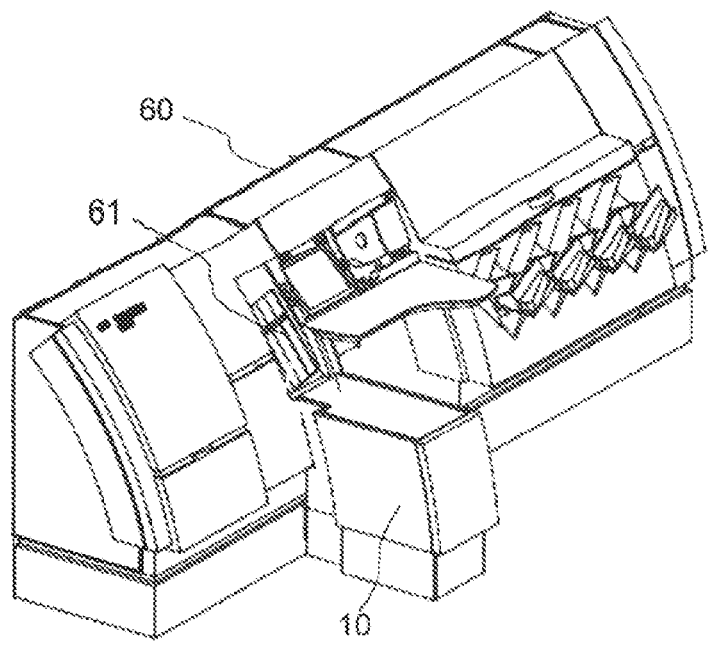
Figure 1C:
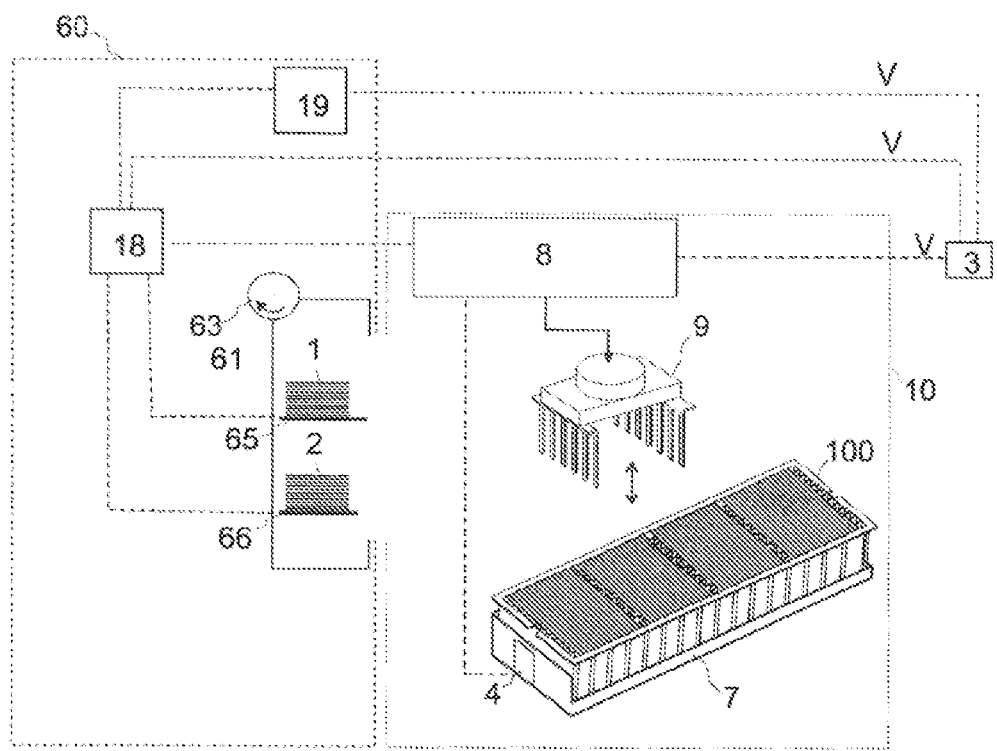

In FIG. 1b there is represented an apparatus 60 for processing value documents, at the input side of which an input module 10 is attached. The input module 10 is configured for the input of value documents, e.g. bank notes, into an input pocket 61 of the apparatus 60 and for this purpose includes a gripper 9 which removes a stack of value documents from a container and inserts this into an input pocket 61 of the apparatus. The value documents 1 inputted into the input pocket are subsequently transported to the singling device 63 by means of a feeding device 65, 66, cf. FIG. 1c. The apparatus 60 transports the singled value documents, checks and, where applicable, sorts them and places them down in one or several output pockets of the apparatus 60. The input module 10 may be configured to receive one or several containers 100.

The input module 10 contains a gripper 9 in order to remove value documents 1 in stacks from a storage region of the container 100 and to insert these into the input pocket 61 of the apparatus 60. For this purpose, the container 100 was manually or automatically inserted into a container receiving means 7 of the input module 10. The container receiving means 7 may be equipped with an identification device 4 to determine the identification of the container 100. The identification device 4 transmits the identification of the respective container 100 to a control device 8 of the input module 10. The control device 8 is connected to a protocol device 3 from which it can obtain linking information about the respective container having the container identification ascertained by the identification device 4 and, where applicable, about further containers, cf. FIG. 2. The gripper 9 is driven by the control device 8 such that it removes the value documents 1 of a first deposit and value documents 2 of a second deposit from the container 100 and inserts them separately from each other into the input pocket 61 of the value document processing apparatus 60. In doing so, the value documents 1 of the first deposit (e.g. ID16) and value documents 2 of the second deposit (e.g. ID17) are placed on two different rakes 65, 66 of the feeding device. The motion of the rakes 65, 66 is controlled by a different control device 18 which may likewise be connected to the protocol device 3, cf. FIG. 2.

The control device 18 controls the value document feeding device 65, 66 such that the value documents of the first and second deposit are fed separately from each other to the singling device 63 of the value document processing apparatus. The value document feeding device is preferably controlled such that between the singling of the last value document of the first deposit and the singling of the first value document of the second deposit, a pause is taken in which no value document is fed to the singling device. In this way, a secure separation of the two deposits is achieved. The pause is preferably at least 5 times the duration of the time interval between the singling of two immediately successive value documents of the same deposit.

As an alternative to an input module 10, a robot may be intended which includes a gripper 9 to automatically remove the value documents from containers 100 and insert them into the input pocket 61 of the apparatus 60 (not shown). The robot can be autonomous or a part of the apparatus 60. The containers 100 loaded with value documents can be transported by means of a transport apparatus to the apparatus 60 into the capture region of the robot gripper, and the empty containers can be transported away from the robot after the value document removal and, where applicable, transported to a preparation station.

In FIG. 1d, a preparation station is shown at which an operator 50 has removed value documents 1 of a deposit from a delivery container 16 in order to insert them into a container 100. The operator 50 reads in, with the aid of a capture device 6 (e.g. barcode scanner) the deposit identification ID16 of the delivery container 16 and the container identification B1 of the container 100, see FIG. 1. For the container having the container identification B1, the protocol device 3 can ascertain (on the basis of information lodged in its software for that container) that it includes 4 storage regions and the location of the respective storage region along the container. In addition to the insertion, further steps can be taken at the preparation station to prepare the value documents for their machine processing.

The capture device 6 is connected (e.g. wirelessly) to the protocol device 3 and informs it of the deposit identification and the container identification B1 respectively read in. The operator can insert the value documents of the deposit ID16 into any of the four storage regions of the container 100. The insertion of the value documents of the deposit into the container 100 is monitored by means of a monitoring device 15 which is connected to the protocol device 3. In this example, the monitoring device 15 includes a light barrier curtain with eight light barriers. In the example shown, for each storage region two light barriers are intended. However, one single light barrier per storage region may also be sufficient. The container 100 is inserted in a slanted container receiving means which includes a light-reflecting plate on the side opposite the light barriers. Due to the slant, the inserted value documents slide downward due to gravity so that they are aligned along the lower side edge. A capture device 14 for capturing the container identification of the container 100 is mounted to the container receiving means. Alternatively, the container identification can also be captured by means of the barcode scanner 6.

Upon the manual insertion of the value documents into the container 100, the respective light barriers are interrupted and the monitoring device 15 transmits to the protocol device 3 which of the light barriers was/were interrupted. Taking into account the location of the storage regions along the container, the protocol device 3 can thus determine in which of the storage regions of the container the respective value documents were inserted. The protocol device 3 then links the deposit identification ID16 previously read in to the storage region identification AB1 of that storage region for which the monitoring device 15 has registered the insertion of the value documents and to the container identification B1. The protocol device 3 transmits this linking information to the control device 18 and/or to the accounting device 19, which stores the transmitted linking information V and uses it later to assign the value documents removed from the respective storage region of the respective container to the respective deposit.

Instead of a light barrier curtain, the monitoring device can also include a distance sensor 25, cf. FIG. 1a, which can determine the distance of an object that has entered its capture region, e.g. the operator's hand or the value document stack. On the basis of the distance, the protocol device can determine the respective storage region in which the respective value documents are inserted.

Figure 2:
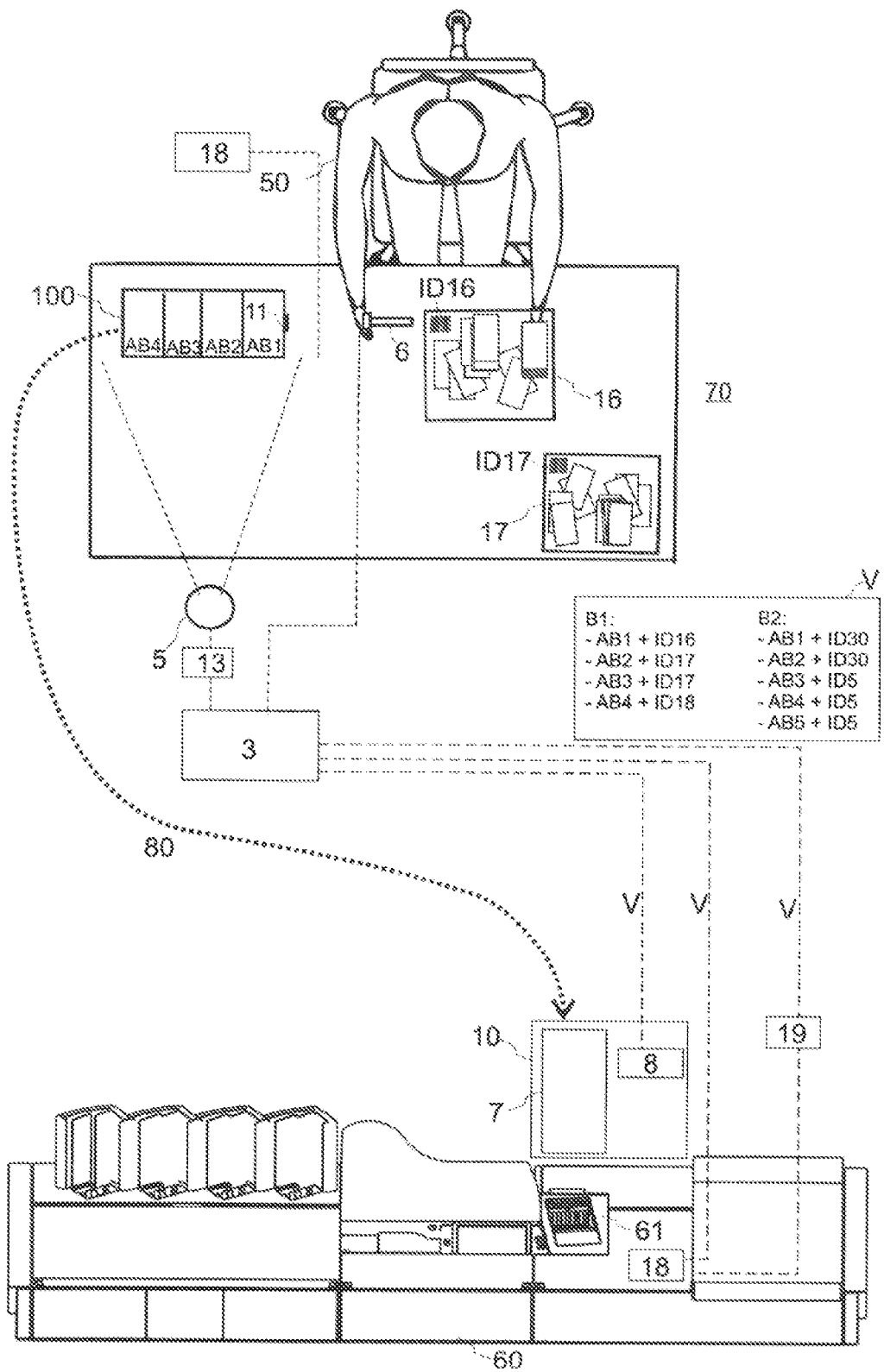

In the upper part of FIG. 2, a preparation station is shown where a container 100 is filled with value documents by an operator 50. At the beginning, the operator 50 reads in the container identification B1 of the container 100 with the aid of a capture device 6 (e.g. barcode scanner) which transmits the container identification B1 to a protocol device 3. If containers of different types are employed at the preparation station, the protocol device 3 can ascertain, on the basis of the container identification, the locations of the storage regions defined for this container. The value documents of two different deposits are brought to the preparation station in delivery containers 16, 17, in which the value documents were inserted by the respective depositor. FIG. 2 shows two safebags 16, 17 (single-use containers for value documents) as delivery containers, which contain the value documents of two different deposits. The operator 50 first picks up the safebag 16 and reads the deposit identification ID16 thereof with the aid of the same capture device 6. The operator then opens the safebag 16, removes the value documents of the first deposit contained therein and places them the first storage region AB1 of the container 100. The operator 50 then picks up the safebag 17, reads the deposit identification ID17 thereof with the aid of the capture device 6, opens the safebag 17. In this example, the value documents of the second deposit contained therein are inserted into the second storage region AB2 and in the third storage region of the container 100. Value documents of a further deposit ID18, whose delivery container is not shown, are inserted into the fourth storage region AB4 of the container 100. Alternatively, other delivery containers can also be used, e.g. value document cassettes with unique identification used as deposit identification.

The insertion of the value documents of the first and second deposit into the container 100 is monitored by means of a monitoring device 5, which in this example includes a (photo or video) camera. The monitoring device 5 may additionally be adapted to capture the container identification of the container 100 and/or the deposit identification ID16, ID17 of the delivery containers 16,17, which, where applicable, can be held towards the camera 5 by the operator for this purpose. The capture device 6 can then be omitted.

The camera 5 is directed to the container 100 and the region thereabove from obliquely above and captures images at different points in time during the value document preparation, e.g. respectively before and after the insertion of value documents into the container 100 by the operator 50. For example, by the capture of the deposit identification ID1 of the first delivery container by means of the capture device 6 the camera 5 is triggered to take a first image of the container 100 in certain and to take a respective further image of the container 100 at time intervals therefrom, in order to take an image thereof respectively before and after the insertion of the value documents into the container. The images taken by the camera 5 are subjected to a difference image analysis, in which the respective difference of the further images to the first image is determined. However, also the difference between two images taken consecutively can always be established. On the basis of the respective image difference, it is ascertained in which of the receiving regions AB1, AB2, AB3 or AB4 the value documents of the respective deposit were inserted. If containers with different storage regions are used at the preparation station, the location of the storage regions of the respective container 100 is taken into account when determining into which storage region value documents are currently inserted.

The control of the image recording of the camera 5 and the difference image comparison are carried out by a control and evaluation device 13 which is connected to the camera 5 and to the protocol device 3. If during the difference image comparison a difference is ascertained in the image detail of a storage region AB1, AB2, AB3 and/or AB4 of the container 100, which indicates that value documents were inserted into one of the storage regions of the container 100, the control and evaluation device 13 establishes the storage region identification assigned to the respective storage region and transmits this to the protocol device 3. The protocol device 3 links the storage region identification established by the control and evaluation device 13 to the deposit identification previously captured by the capture device 6 and to the previously captured container identification B1 of the container 100. In the present example, based on this image comparison, the deposit identification ID16 of the first deposit is linked to the storage region identification AB1 of the first storage region and to the container identification B1. And the deposit identification ID17 of the second deposit is linked to the storage region identifications AB2 and AB3 of the second and third storage region and to the container identification B1. And the deposit identification ID18 of the d deposit is linked to the storage region identifications AB4 of the fourth storage region and to the container identification B1. An example of the linking information V generated by the protocol device is represented in FIG. 2 on the right.

In addition to the linking information V for the container 100 having the container identification B1, also the linking information V for a further container having the container identification B2 is contained therein by way of example. For the further container (not shown) having the container identification B2, the protocol device was able to ascertain (on the basis of information lodged in the software) that this includes five storage regions and the location of the respective storage region along the container. For the container with the container identification B2, it was ascertained by means of the difference image comparison that the deposit ID30 was inserted in the storage regions AB1 and AB2, and the deposit ID5 in the storage region AB3, AB4 and AB5. The protocol device 3 generates therefrom for B2 the linking information shown in FIG. 2 and transmits it to the control device 8 or 18 and/or to the accounting device 19, which stores the transmitted linking information V.

The control device 8 or 18 and/or the accounting device 19 includes software which, on the basis of the container identification which has been transmitted to it by the identification device, for the respective container having the respective container identification, finds linking information V associated with the respective container and, on the basis of the linking information V, ascertains for each storage region of the respective container to which deposit identification the individual storage region identifications of the respective container are linked, respectively. Thus, the control device 8 or 18 and/or the accounting device 19 assigns the value documents present in the respective storage region of the respective container to the respective deposit.

The arrangement may also include a transport device with which the container containing the value documents of the first deposit and of the second deposit in different storage regions, and where applicable further containers, can be transported from the preparation station 70 (via a transport path 80) to an input module 10 of the value document processing apparatus 60. Alternatively, the respective container can also be transported directly to the value document processing apparatus 60 (without input module).

At the value document processing apparatus, the value documents are removed from the container 100 and fed to the value document processing apparatus 60. In one embodiment, the value documents of the different storage regions are fed separately to the singling device 63, without taking into account their deposit association, i.e. without bringing together the value documents of the same deposit which were removed from different storage regions. And the value document processing apparatus 60 then establishes upon checking the value documents the value W of the value documents removed therefrom individually for each storage region and transmits these values W to the accounting device 19, cf. FIG. 1d. From the linking information V, the accounting device 19 derives which storage regions belong to the same deposit and sums up for each deposit the individual values W of all those storage regions which contained value documents of the respective deposit, which values were established by the value document processing apparatus. Thus, based on the counting results of the value document processing apparatus 60 and based on the linking information, the accounting device 19 can respectively carry out an accounting of the value documents of the respective deposit.

FIGS. 3a-f show a first preferred embodiment for the procedure of feeding the value documents, and FIGS. 4a-e show a second preferred embodiment. To simplify the representations in FIG. 3b-f and FIG. 4b-e, the control devices 8,18 and their connection to the protocol device 3 are only shown in FIG. 3a, 4a. In the upper part of the input pocket 61 there is located a singling device 63, by which value documents are drawn individually one after the other from the respective value document stack in order to check, count and, where applicable, sort them by the value document processing apparatus 60.

In the embodiment of FIGS. 3a-f, the gripper 9 is controlled by the control device 8 of the input module 10 in such a way that it carries out the placing of the value documents on the two rakes 65, 66 in dependence on the linking information V. The value documents 1 of the first deposit ID16 removed from the first storage region AB1 of the container 100 are placed on the upper rake 65. From the second storage region AB2 of the container 100 a first subset of value documents 2a of the second deposit ID17 is removed and placed on the lower rake 66. From the third storage region AB3 of the container 100, the gripper 9 removes a second subset 2b of value documents of the second deposit ID17 and places it on the first subset of value documents 2a of the second deposit ID17, which is already on the lower rake 66, cf. FIG. 3a. Upon being placed on the lower rake 66, the value document stacks 2a, 2b removed from different storage regions of the container 100 are brought together and combined into one single value document stack 2, cf. FIG. 3b. During the insertion of the value documents 2a, 2b, the value documents 1 of the first deposit ID16 can already be singled by means of the singling device 63. After it has been combined, the value document stack 2 is transported upward to the singling device 63 with the aid of the rake 66, see FIG. 3c. Based on the linking information V transmitted to it, the control device 18 of the feeding device knows that it must wait with the upward transport of the lower rake 66 until the insertion of the substacks 2a, 2b of the second deposit ID17 on the lower rake 66 is completed. The control device 18 moreover ensures that the feed of the second value document stack 2 to the singling device 63 is delayed until the last value document of the first value document stack 1 has been drawn from the upper rake 65 and the upper rake 65 has been taken away from the singling device 63, cf. FIG. 3d. This is then transported back to the lower region of the input pocket 61 (cf. FIG. 3e), where it is again available for inserting the further value document stack of the further deposit ID18, cf. FIG. 3f.

The value documents belonging to different deposits are not brought together but inserted separately from each other. Thus, the value documents 1 of the first deposit ID16 were placed on the upper rake 65 and the value documents 2 of the second deposit ID17 on the lower rake 66. This causes that upon singling the value documents by means of the singling device 63 there arises a time gap between the two deposits, i.e. between drawing off the last value document of deposit ID16 and drawing off the first value document of the second deposit ID17. Due to this time gap, the value document processing apparatus 60 can securely separate the two deposits from each other.

In the embodiment of FIGS. 4a-e, the value document stacks 2a, 2b of the second deposit ID17 removed from different storage regions of the container 100 are not brought together and combined into one single value document stack 2 when the gripper 9 places them onto the lower rake 66. Instead, the value document stacks 2a, 2b of the second deposit ID17 are brought together and combined into one single value document stack 2 with the aid of the two rakes 65, 66 only later, after they were inserted separately from each other. In FIG. 4a, the gripper 9 has placed the first substack of value documents 2a of the second deposit ID17, which it has removed from the storage region AB2, on the upper rake 65 and is in the act of placing the second substack of value documents 2*b* of the second deposit ID17, which it has removed from the storage region AB3, onto the lower rake 66 (FIG. 4*b*). In FIG. 4*c*, the lower rake 66 with the substack 2*b* has approached the underside of the upper rake 65. The upper rake 65 is then pulled out so that the substack 2*a* of the upper rake 65 is placed down onto the substack 2*b* of the lower rake 66 and the two substacks 2*a*, 2*b* of the second deposit ID17 are combined into one single stack 2, cf. FIG. 4*d*. Combining the two substacks 2*a*, 2*b* can be carried out before or at the same time as value documents are singled from the upper side of the substack 2*a* by the singling device 63. For no value documents being pulled along sideways upon pulling out the upper rake 65, a retaining element can be used (not shown) or the value documents are retained by the side wall of the input pocket 61, which has a corresponding opening for the upper rake 65 to dive through.

The upper rake 65 is then transported back to the lower region of the input pocket 61 and is available there again for inserting the value documents of the further deposit ID18, cf. FIG. 4*e*.

The control device 18 of the feeding device includes software which controls the two rakes 65, 66 of the feeding device such that the substacks 2*a*, 2*b* of the second deposit ID17, which were removed from different storage regions of the container, are combined in the feeding device into one single value document stack. The control device 18 decides, on the basis of the linking information V, whether the value documents placed on the two rakes 65, 66 are to be fed to the singling device separately from each other or together (i.e. as a combined value document stack). The two value document stacks placed on the two rakes here are only brought together and combined into one single value document stack if they belong to the same deposit. Due to the bringing together into one single value document stack, the value document processing apparatus 60 can process the second deposit more quickly.

Value document stacks which belong to different deposits are not brought together and combined into one single value document stack. If value document stacks of different deposits are placed on the two rakes 65, 66, in the procedure of FIG. 4*a-e* the pulling out of the upper rake 65 is carried out simply at a later point in time, only after the last value document of the value document stack located on the upper rake 65 has been drawn off by the singling device 63. This causes a pause between the two deposits upon singling, i.e. between drawing off the last value document of the upper rake 65 and drawing off the first value document of the lower rake 66 (which belongs to a different deposit). Due to this pause, the value document processing apparatus 60 can securely separate the two deposits from each other.

In a further embodiment (not shown), the feeding device includes—instead of the two rakes 65, 66—only one single receiving means (e.g. rake, plate, lifting floor) for receiving the value document stacks inserted with the gripper 9. Here too, bringing together the substacks 2*a*, 2*b* of the same deposit upon placing them down onto the receiving means is possible, as it is shown in FIG. 3*a,b* upon placing the value document stacks 2*a,b* down on the rake 66. In this embodiment, the structure of the feeding device is simpler. However, it is necessary to wait for the insertion of the value documents and feeding of the inserted value document stack to the singling device 63, before the singling can be started. Then, it is not possible that already value documents of a second deposit are inserted simultaneously with the singling of a first deposit.

As an alternative to the embodiments shown—instead of drawing off the topmost value document from the respective value document stack (as in FIGS. 3*a-f* and 4*a-e*)—a singling device positioned at the lower end of the input pocket 61 can be used, which draws off the bottommost value document of a value document stack inserted into the input pocket 61. Bringing together the substacks 2*a*, 2*b* of the same deposit into one combined substack 2 is then carried out at the upper side of the substack 2*a* inserted first which is singled first. Here too, bringing together the two substacks of the same deposit can be effected already upon insertion (analogous to FIG. 3*a*, 3*b*), or only after the insertion of the two substacks (analogous to FIG. 4*c*, 4*d*) by pulling out a rake located between the two substacks 2*a*, 2*b*.

The invention claimed is:

1. A method for processing value documents, the method comprising:
   providing a value document container at a preparation station, the value document container comprising several storage regions for value documents, wherein each of the storage regions has assigned thereto a storage region identification,
   capturing a container identification of the value document container with one or more of a monitoring device, a first capture device, and a second capture device,
   capturing, by one or more of the monitoring device and the first capture device, a first deposit identification of a first deposit whose value documents are to be inserted into the value document container,
   removing the value documents of the first deposit from a delivery container of the first deposit and inserting the value documents of the first deposit into at least one first storage region of the value document container,
   automatically capturing, by the monitoring device, into which storage regions or into which one of the storage regions of the value document container the value documents of the first deposit are inserted, and
   linking the first deposit identification to the at least one storage region identification of the at least one first storage region and to the container identification as captured by said one or more of the monitoring device and the first capture device,
   capturing, by one or more of the monitoring device and the first capture device, a second deposit identification of a second deposit whose value documents are to be inserted into the value document container,
   removing the value documents of the second deposit from a delivery container of the second deposit and inserting the value documents of the second deposit into at least one second storage region of the value document container,
   automatically capturing, by the monitoring device, into which storage regions or into which one of the storage regions of the container the value documents of the second deposit are inserted,
   linking the second deposit identification to the at least one storage region identification of the at least one second storage region and to the container identification as captured by said one or more of the monitoring device and the first capture device,
   providing the value document container to a value document processing apparatus,
   deriving with which at least one storage region identification and with which container identification the first deposit identification is linked and with which at least one storage region identification and which container identification the second deposit identification is linked, and assigning the value documents removed from the respective storage region of the container to the first deposit or to the second deposit.

2. The method according to claim 1, further comprising:

providing an accounting of the value documents of the respective deposit on the basis of counting results of the value document processing apparatus for the value documents removed from the respective storage region and on the basis of the assignment of these value documents to the first deposit or the second deposit, and/or inputting the value documents of the first and second deposit into the value document processing apparatus and/or into a singling device of the value document processing apparatus in dependence on the assignment of the value documents to the first deposit or the second deposit.

3. The method according to claim 1, wherein the monitoring device comprises a camera.

4. The method according to claim 1, wherein the monitoring device comprises a light barrier curtain made of a plurality of light barriers.

5. The method according to claim 1, wherein the monitoring device comprises at least one distance sensor.

6. The method according to claim 1, wherein the first and/or second capture devices comprises at least one of a barcode reader, a QR code reader, and an RFID reader.

7. The method according to claim 1, wherein the container identification of the value document container comprises at least one of a barcode, a QR code, and an RFID.

8. The method according to claim 1, wherein the first deposit identification comprises at least one of a barcode, a QR code, and an RFID.

9. The method according to claim 1, wherein the second deposit identification comprises at least one of a barcode, a QR code, and an RFID.

10. The method according to claim 1, wherein value document processing apparatus comprises a gripper.

* * * * *